No. 625,141. Patented May 16, 1899.
A. A. BROWER.
OIL BURNER.
(Application filed July 30, 1898.)
(No Model.)
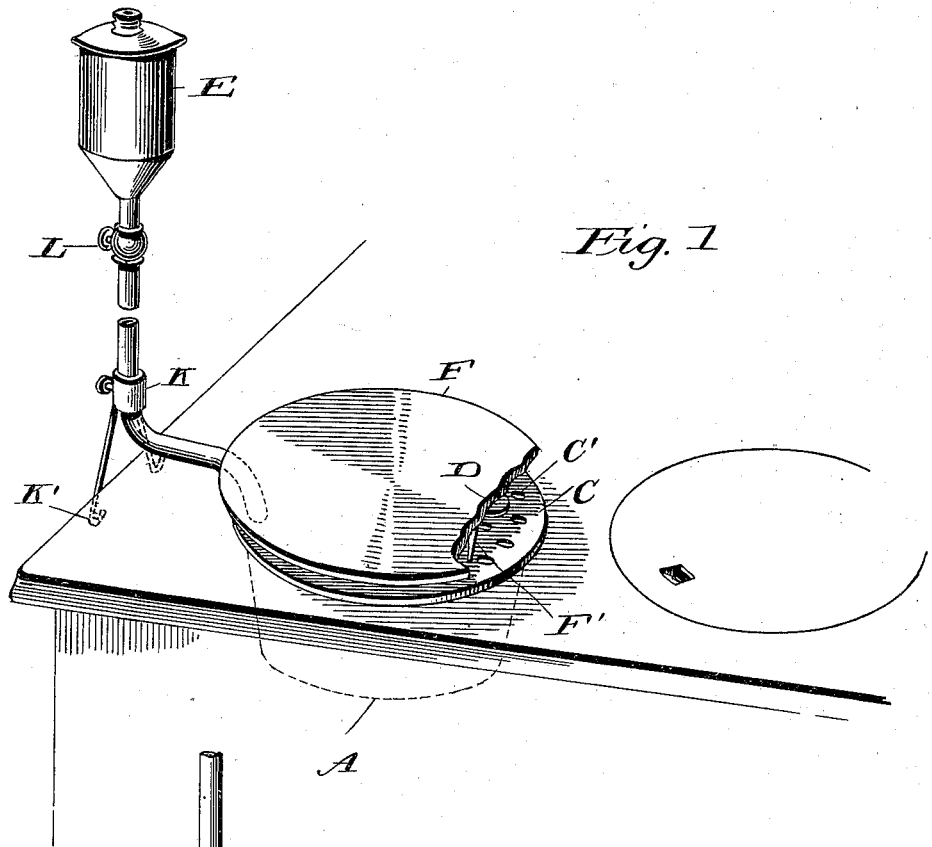
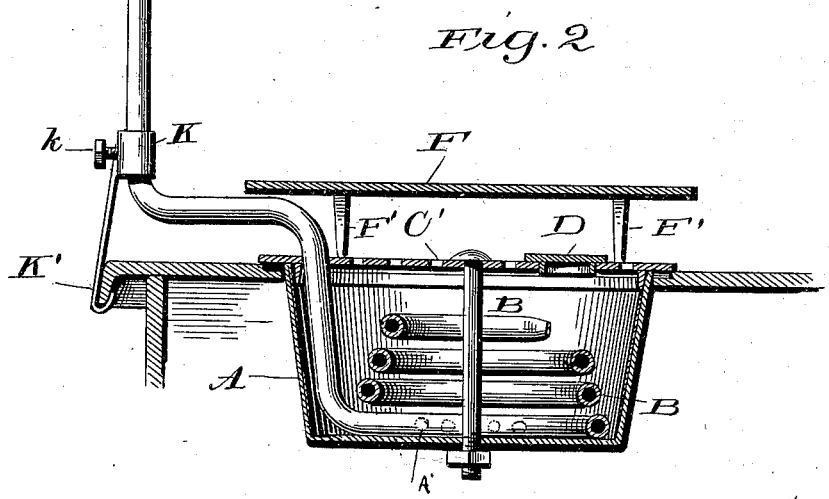
THE NORRIS PETERS CO., PHOTO-LITHO., WASHINGTON, D. C.

UNITED STATES PATENT OFFICE.

ASHER A. BROWER, OF EMPORIA, KANSAS, ASSIGNOR OF ONE-HALF TO W. D. PAYTON, OF SAME PLACE.

OIL-BURNER.

SPECIFICATION forming part of Letters Patent No. 625,141, dated May 16, 1899.

Application filed July 30, 1898. Serial No. 687,323. (No model.)

*To all whom it may concern:*

Be it known that I, ASHER A. BROWER, a citizen of the United States, residing at Emporia, in the county of Lyon and State of Kansas, have invented certain new and useful Improvements in Oil-Burners; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in oil or gasolene burners, and especially to the provision of a receptacle which is adapted to be placed within a stove, in which receptacle is carried a coiled pipe through which oil is allowed to flow, which is designed to be volatilized by the heat within the receptacle and be ignited at the end of the said coil, the lining of the said receptacle being provided with asbestos.

More specifically, the invention consists in providing a receptacle designed to be placed within a stove through a cover-opening and having a perforated top bolted in the bottom of said receptacle and within which the heating-coil is disposed, a tray resting on the perforated top, and a device for holding the burner in place.

To these ends and to such others as the invention may pertain, the same consists, further, in the novel construction, combination, and the adaptation of parts, as will be hereinafter more fully described, and then clearly defined in the appended claim.

My invention is clearly illustrated in the accompanying drawings which, with the letters of reference marked thereon, form a part of this application, and in which—

Figure 1 is a perspective view showing my heating device attached to a stove, and Fig. 2 is a central vertical sectional view through the receptacle and the pipes leading thereto.

Reference now being had to the details of the drawings by letter, A designates the receptacle, which contains the coil B. This receptacle is perforated about its circumference, as at A', and has a removable top C, which is apertured, as at C', in order to allow the air to escape from the combustion-chamber, and has a removable lid D, in which a latch may be inserted when it is desired to ignite the gas or oil at the outlet end of the said coil. The inner surface of the combustion-chamber or receptacle is preferably lined with asbestos to protect the walls thereof. The said coil extends through the top of the receptacle and upward and communicates with an oil-tank E, which has at its upper end a screw-threaded cap, which is apertured to allow the escape of the gas and to guard against any explosion from the accumulation of gas within the receptacle. F is a tray which has legs F', which tray is adapted to rest upon the upper removable part of the said receptacle for the purpose of bringing the surface on which kettles, &c., are to be placed above the bent portion of the piping coming from the coil. In the construction of said receptacles it is preferable to make them of such a size that the flange at the top may rest on the shoulder in the stove-top, which is provided to receive the cover, although they may be made of various sizes to fit different stoves.

In order to attach the device to a stove, a collar K is provided, which is mounted on the pipe leading to the coil, and said collar has two downwardly and outwardly bent hooks K', which are adapted to engage under the edge of the stove-top, as illustrated in Fig. 1 of the drawings, and mounted in a threaded aperture of said collar is a tightening-screw $k$, whereby the collar may be held securely to the piping. Adjacent to the lower end of the tank in the pipe leading to the coil is a stop-cock L, whereby the supply of oil which it is desired to allow to flow to the coil may be regulated.

Having thus described my invention, what I claim to be new, and desire to secure by Letters Patent, is—

In combination with a stove-top, the receptacle A fitted in the cover-aperture, the coil B contained within said receptacle, the perforated lid through which the pipe, out of which the coil is formed passes, the bolt for securely holding the lid to the receptacle to retain the coil, the collar K embracing said pipe, and having integral downwardly and laterally disposed arms, the hooked ends K' engaging under the flanges of the stove, whereby the coil and receptacle are held from turning, as set forth.

In testimony whereof I affix my signature in presence of two witnesses.

ASHER A. BROWER.

Witnesses:
 A. D. PIERSALL,
 W. J. JONES.